United States Patent
Hoshino et al.

(10) Patent No.: US 11,154,842 B2
(45) Date of Patent: Oct. 26, 2021

(54) EXHAUST GAS PURIFICATION UNDERFLOOR CATALYST AND CATALYST SYSTEM

(71) Applicant: Cataler Corporation, Kakegawa (JP)

(72) Inventors: Sho Hoshino, Kakegawa (JP); Noboru Sato, Kakegawa (JP); Keisuke Murawaki, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 63 days.

(21) Appl. No.: 16/082,039

(22) PCT Filed: Feb. 28, 2017

(86) PCT No.: PCT/JP2017/007984
§ 371 (c)(1),
(2) Date: Sep. 4, 2018

(87) PCT Pub. No.: WO2017/154685
PCT Pub. Date: Sep. 14, 2017

(65) Prior Publication Data
US 2019/0151829 A1  May 23, 2019

(30) Foreign Application Priority Data
Mar. 9, 2016 (JP) ............................... JP2016-045608

(51) Int. Cl.
*B01J 23/63* (2006.01)
*B01D 53/94* (2006.01)
(Continued)

(52) U.S. Cl.
CPC .............. *B01J 23/63* (2013.01); *B01D 53/94* (2013.01); *B01D 53/945* (2013.01);
(Continued)

(58) Field of Classification Search
CPC ........ B01J 23/63; B01J 23/44; B01J 35/0006; B01J 35/026; B01J 35/04; B01J 35/1014;
(Continued)

(56) References Cited

U.S. PATENT DOCUMENTS 6,294,140 B1 * 9/2001 Mussmann ............ B01J 35/04
423/213.5
6,497,851 B1  12/2002 Hu et al.
(Continued)

FOREIGN PATENT DOCUMENTS

CN  1205652 A  1/1999
CN  103458997 A  12/2013
(Continued)

OTHER PUBLICATIONS

Apr. 25, 2017 Search Report issued in International Patent Application No. PCT/JP2017/007984.
(Continued)

*Primary Examiner* — Sheng H Davis
*Assistant Examiner* — Michael Forrest
(74) *Attorney, Agent, or Firm* — Oliff PLC

(57) ABSTRACT

An exhaust gas purification underfloor catalyst characterized in having a catalyst layer having a lower layer and an upper layer, the lower layer containing alumina and $CeO_2$, the noble metal content of the lower layer being at most 0.5 mass % in relation to the mass of the lower layer, the upper layer containing Rh, alumina, and $CeO_2$, the amount of noble metals other than Rh contained being 1 mol % or less in relation to the total amount of noble metals contained in the upper layer, the total amount of $CeO_2$ contained in the lower layer and the upper layer being 14 g/L to 30 g/L, the amount of $CeO_2$ contained in the upper layer being 7 g/L to
(Continued)

25 g/L, and the amount of $CeO_2$ contained in the lower layer being 20% or more of the amount of $CeO_2$ contained in the upper layer.

13 Claims, 1 Drawing Sheet

(51) Int. Cl.
| | |
|---|---|
| *F01N 13/00* | (2010.01) |
| *B01J 23/44* | (2006.01) |
| *B01J 35/00* | (2006.01) |
| *B01J 35/02* | (2006.01) |
| *B01J 35/04* | (2006.01) |
| *B01J 35/10* | (2006.01) |
| *B01J 37/02* | (2006.01) |
| *B01J 37/08* | (2006.01) |
| *F01N 3/28* | (2006.01) |

(52) U.S. Cl.
CPC .......... *B01D 53/9468* (2013.01); *B01J 23/44* (2013.01); *B01J 35/0006* (2013.01); *B01J 35/026* (2013.01); *B01J 35/04* (2013.01); *B01J 35/1014* (2013.01); *B01J 35/1019* (2013.01); *B01J 35/1023* (2013.01); *B01J 37/0215* (2013.01); *B01J 37/0236* (2013.01); *B01J 37/08* (2013.01); *F01N 3/281* (2013.01); *F01N 13/0093* (2014.06); *F01N 13/0097* (2014.06); *B01D 53/9472* (2013.01); *B01D 2255/1023* (2013.01); *B01D 2255/1025* (2013.01); *B01D 2255/2042* (2013.01); *B01D 2255/2065* (2013.01); *B01D 2255/2092* (2013.01); *B01D 2255/407* (2013.01); *B01D 2255/65* (2013.01); *B01D 2255/904* (2013.01); *B01D 2255/908* (2013.01); *B01D 2255/9022* (2013.01); *B01D 2255/9202* (2013.01); *B01D 2255/9207* (2013.01); *B01D 2257/404* (2013.01); *B01D 2257/702* (2013.01); *F01N 2370/02* (2013.01); *F01N 2510/0684* (2013.01)

(58) Field of Classification Search
CPC .......... B01J 35/1019; B01J 35/1023; B01J 37/0215; B01J 37/0236; B01J 37/08; F01N 13/0093; F01N 13/0097; F01N 3/281; B01D 53/94; B01D 53/945; B01D 53/9468
See application file for complete search history.

(56) References Cited

U.S. PATENT DOCUMENTS

| | | | |
|---|---|---|---|
| 2009/0124494 | A1 | 5/2009 | Suzuki et al. |
| 2010/0150792 | A1 | 6/2010 | Kitamura et al. |
| 2012/0031085 | A1 | 2/2012 | Zhang et al. |
| 2012/0186238 | A1* | 7/2012 | Akamine ............ B01D 53/945 60/299 |
| 2013/0213000 | A1 | 8/2013 | Segawa |
| 2013/0345049 | A1* | 12/2013 | Chinzei .................. B01J 23/63 502/303 |
| 2015/0375206 | A1 | 12/2015 | Aoki |
| 2017/0183995 | A1* | 6/2017 | Utschig .................. B01J 23/58 |
| 2017/0348674 | A1 | 12/2017 | Suzuki et al. |

FOREIGN PATENT DOCUMENTS

| | | |
|---|---|---|
| CN | 104981288 A | 10/2015 |
| JP | 2000-502602 A | 3/2000 |
| JP | 2006-205134 A | 8/2006 |
| JP | 2008-240622 A | 10/2008 |
| JP | 2009-220100 A | 10/2009 |
| JP | 2009-255084 A | 11/2009 |
| JP | 2012-096201 A | 5/2012 |
| JP | 2015-85241 A | 5/2015 |
| JP | 2016-112489 A | 6/2016 |
| WO | 97/23278 A1 | 7/1997 |
| WO | 2016/092862 A1 | 6/2016 |

OTHER PUBLICATIONS

Apr. 25, 2017 Written Opinion issued in International Patent Application No. PCT/JP2017/007984.
Sep. 11, 2018 International Preliminary Report on Patentability issued in International Patent Application No. PCT/JP2017/007984.
Sep. 18, 2019 Extended European Search Report issued in European Patent Application No. 17763025.8.
Jul. 1, 2020 Office Action issued in Chinese Patent Application No. 201780014478.1.

* cited by examiner

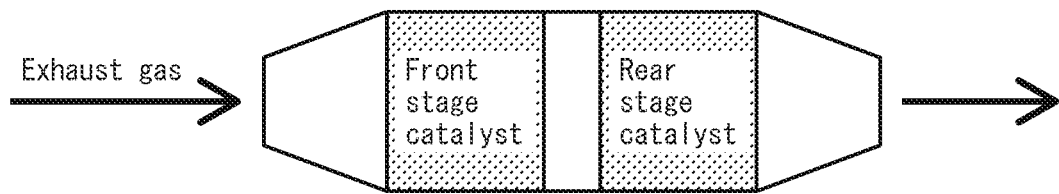

EXHAUST GAS PURIFICATION UNDERFLOOR CATALYST AND CATALYST SYSTEM

FIELD

The present invention relates to an exhaust gas purification underfloor catalyst and a catalyst system. More specifically, it relates to an underfloor catalyst that functions as a sweeper in an exhaust gas purification catalyst system, and to a catalyst system using the underfloor catalyst.

BACKGROUND

Three-way catalysts having noble metals supported on inorganic oxides are known types of exhaust gas purification catalysts used to treat vehicle exhaust gas. Such three-way catalysts are widely used as catalysts, as they allow efficient simultaneous removal of hydrocarbons (HC) nitrogen oxides ($NO_x$) and carbon monoxide (CO).

As noble metals to be used as active components in exhaust gas purification catalysts such as three-way catalysts, it is common to use a combination of platinum (Pt) and palladium (Pd) which have excellent oxidative activity and contribute to purification of mainly HC and CO, and rhodium (Rh) which has excellent reducing activity and contributes to purification of mainly $NO_x$.

Restrictions on $NO_x$ in particular, have become ever tighter in recent years. This has increased the importance of Rh, an element with excellent purifying activity for $NO_x$. Rh, however, is produced in low quantity and is highly expensive. It is therefore preferred to minimize the amount of Rh used in exhaust gas purification catalysts.

Incidentally, it is common to employ systems that carry out exhaust gas purification in a multistage manner, with two or more vehicle exhaust gas purification catalysts installed in an exhaust gas flow channel. In such cases, multiple types of noble metals contained in the catalyst are situated at optimal locations within the multistage catalyst, in consideration of their respective catalytic activities and durabilities. This ensures effective use of the noble metals while allowing the exhaust gas purification performance of the catalyst system as a whole to be optimized.

Such a multistage catalyst is usually used in two stages: a front stage catalyst (start-up catalyst, hereunder referred to as "S/C catalyst") situated at the upstream end, and a rear stage catalyst (usually situated under the floor of the vehicle and referred to as "underfloor catalyst"), situated at the downstream end of the exhaust gas flow channel. Examples of two-stage exhaust gas purification catalysts are the technologies known from PTLs 1 to 3, for example.

PTL 1 describes an exhaust gas purification catalyst having a catalyst layer containing Rh and Pd or Pt situated at the upstream end, and a catalyst layer containing Rh alone as a noble metal, situated at the downstream end, wherein the amount of Rh in the downstream catalyst and the coat length of the catalyst layer are specified, and high $NO_x$ purification performance is maintained even after endurance under A/F fluctuating conditions.

PTL 2 describes an exhaust gas purification catalyst having a first three-way catalyst with oxygen storage capacity situated at the downstream end and a second three-way catalyst containing Rh situated at the upstream end, wherein the oxygen storage capacity of the second three-way catalyst is limited in order to achieve both minimal deterioration in fuel efficiency, and $NO_x$ purification performance, during restart of an internal combustion engine.

PTL 3 describes the use of an exhaust gas purification catalyst wherein a catalyst containing Rh alone as a noble metal is situated at the upstream end and a catalyst with oxidative activity is situated at the downstream end, during which the injected fuel value is changed by comparing the gas entering the catalyst and the gas leaving the catalyst, in order to optimize the air-fuel ratio and obtain high $NO_x$ purification performance.

Also known, from PTL 4, is technology wherein the type of noble metal in the catalyst is limited to Rh alone.

Incidentally, catalyst layers in exhaust gas purification catalysts such as described above have conventionally been formed on substrates that lack exhaust gas purification performance, such as cordierite honeycomb substrates. In recent years, however, exhaust gas purification catalysts have been proposed having noble metals supported on substrates made of inorganic oxide particles (PTL 5).

CITATION LIST

Patent Literature

[PTL 1] JP 2012-096201 A
[PTL 2] JP 2008-240622 A
[PTL 3] JP 2006-205134 A
[PTL 4] JP 2009-255084 A
[PTL 5] JP 2015-85241 A

SUMMARY

Technical Problem

When an exhaust gas purification catalyst is used in a catalytic exhaust system for a turbo car, in particular, the distance from the engine to the catalyst is longer compared to a naturally aspirated car. After engine start-up, therefore, a certain period of time is required before the catalyst temperature increases. For this reason, catalysts used in such cases must exhibit warm-up performance, so that they are in a state which allows the exhaust gas to be purified as quickly as possible immediately after engine start-up. Moreover, rear stage catalysts (underfloor catalysts) in 2-stage catalysts must exhibit a sweeper function to purify exhaust gas components that could not be purified by the S/C catalyst.

In order to improve the warm-up performance, most of the noble metals used may be situated in the S/C catalyst, for example. However, doing this necessarily reduces the amount of noble metals in the underfloor catalyst, and the sweeper performance is reduced as a result.

No catalyst system is known that exhibits both warm-up performance and sweeper performance in a conventionally known catalyst configuration.

It is an object of the present invention to improve the current situation described above. This object is achieved by providing an underfloor catalyst that can exhibit a high level of sweeper performance with the minimum necessary types and amounts of noble metals, and a catalyst system exhibiting both warm-up performance and sweeper performance by using the underfloor catalyst.

Solution to Problem

The present invention achieves the aforementioned object by the following construction.

[1] An exhaust gas purification underfloor catalyst comprising a catalyst layer having a lower layer and an upper layer, the lower layer containing alumina and $CeO_2$, the noble metal content of the lower layer being 0.5 mass % or less with respect to the mass of the lower layer, the upper layer containing Rh, alumina and $CeO_2$, the content of noble metals other than Rh being 1 mol % or less with respect to the total noble metals in the upper layer, the total amount of $CeO_2$ in the lower layer and upper layer being 14 g/L to 30 g/L, the amount of $CeO_2$ in the upper layer being 7 g/L to 25 g/L, and the amount of $CeO_2$ in the lower layer being 20% or more of the amount of $CeO_2$ in the upper layer.

[2] The exhaust gas purification underfloor catalyst according to [1], wherein the catalyst layer is a coat layer on the substrate.

[3] The underfloor catalyst according to [2], wherein the coat length of the lower layer is 50% or more of the substrate length from the back end with respect to the direction of gas flow, and the coat length of the upper layer is 70% or more of the substrate length from the front end in the direction of gas flow.

[4] The underfloor catalyst according to [3], wherein the coat length of the lower layer is 50% to 85% of the substrate length from the back end with respect to the direction of gas flow, and the catalyst has a region where the upper layer is directly coated on the substrate in a range of 15% to 50% of the substrate length.

[5] The exhaust gas purification underfloor catalyst according to [1], wherein the lower layer forms part of the substrate, and the upper layer is a coat layer on the substrate.

[6] The underfloor catalyst according to [5], wherein the coat length of the upper layer is 70% or more of the substrate length from the front end in the direction of gas flow.

[7] An exhaust gas purification catalyst system constructed of a front stage catalyst having a substrate and a Pd-containing coat layer on the substrate, and an underfloor catalyst according to any one of [1] to [6].

Advantageous Effects of Invention

According to the present invention there is provided, firstly, an underfloor catalyst that can exhibit a high level of sweeper performance with the minimum necessary types and amounts of noble metals. Since the underfloor catalyst requires fewer types and lower amounts of noble metals to exhibit sweeper performance, more noble metals can be situated in the S/C catalyst.

The invention therefore provides, secondly, a catalyst system combining a S/C catalyst and the aforementioned underfloor catalyst. Such a system allows more types and a greater amount of noble metals to be situated in the S/C catalyst than according to the prior art, and thus exhibits both warm-up performance and sweeper performance.

BRIEF DESCRIPTION OF DRAWINGS

FIG. 1 is a schematic diagram illustrating the construction of the catalyst system of the invention.

DESCRIPTION OF EMBODIMENTS

The underfloor catalyst and catalyst system of the invention will now be described in detail.

<Underfloor Catalyst>

The underfloor catalyst of the invention includes a catalyst layer having a lower layer and an upper layer.

[Substrate]

The underfloor catalyst of the invention may have a substrate. The catalyst layer in the underfloor catalyst of the invention may be present as a coat layer on a separate substrate, or the lower layer of the catalyst layer may form part of the substrate while the upper layer is present as a coat layer on the substrate.

The substrate used in the underfloor catalyst of the invention may be one that is commonly used as a substrate in exhaust gas purification catalysts. A monolith honeycomb substrate may be mentioned as an example. The substrate may have a monolith structure only at the underfloor catalyst section, or the monolith structure may encompass both the underfloor catalyst and the front stage catalyst described below.

The material composing the substrate may be cordierite, SiC, stainless steel or metal oxide particles, for example. The substrate capacity may be about 1 L, for example.

When the lower layer forms part of the substrate, it is sufficient for the substrate to satisfy the following conditions for the lower layer.

[Catalyst Layer]

The catalyst layer in the underfloor catalyst of the invention has a lower layer and an upper layer.

The lower layer contains alumina and $CeO_2$, the noble metal content of the lower layer being 1 mass % or less with respect to the mass of the lower layer, and the upper layer contains Rh, alumina and $CeO_2$, the content of noble metals other than Rh being 1 mass % or less with respect to the total noble metals in the upper layer.

—Lower Layer—

The lower layer of the catalyst layer in the underfloor catalyst of the invention contains alumina and $CeO_2$. However, the lower layer contains essentially no noble metals. The phrase "the lower layer contains essentially no noble metals" means that the noble metal content of the lower layer is 0.5 mass % or less with respect to the mass of the lower layer. The content of noble metals in the lower layer with respect to the mass of the lower layer is preferably 0.3 mass % or less, more preferably 0.1 mass % or less and even more preferably 0.01 mass % or less, and most especially it contains no noble metals.

(Alumina)

The BET specific surface area of the alumina in the lower layer of the catalyst layer is preferably 10 $m^2/g$ or greater, more preferably 50 $m^2/g$ or greater and even more preferably 100 $m^2/g$ or greater.

It is also preferably 1,000 $m^2/g$ or less, more preferably 500 $m^2/g$ or less and even more preferably 250 $m^2/g$ or less.

The mean particle size of the alumina is preferably 0.001 μm or larger, more preferably 0.02 μm or larger and even more preferably 0.1 μm or larger; and preferably 200 μm or smaller, more preferably 100 μm or smaller and even more preferably 25 μm or smaller.

($CeO_2$)

The $CeO_2$ may be contained in the lower layer as single particles of $CeO_2$, or it may be contained in the lower layer as particles of a complex oxide comprising Ce (cerium) and another metal element. The $CeO_2$ is preferably present as a complex oxide. Examples of other metal elements include Zr (zirconium) and rare earth elements (excluding Ce; the abbreviation "Ln" may be used to collectively refer to rare earth elements excluding Ce). Examples of rare earth elements excluding Ce include Y (yttrium), La (lanthanum), Pr (praseodymium), Nd (neodymium), Sm (samarium), Eu (europium), Gd (gadolinium), Er (erbium), Yb (ytterbium) and Lu (lutetium), among which one or more selected from among Y, La, Pr, Nd and Eu are preferred.

The complex oxide is preferably a ceria-zirconia complex oxide containing Ce and Zr (zirconium) (hereunder referred to as "CZ complex oxide").

The CZ complex oxide is preferably:
a complex oxide containing Zr and Ce, and a rare earth element excluding Ce; or
a complex oxide containing Zr and Ce, and one or more rare earth elements selected from among Y, La, Pr, Nd and Eu.

The $CeO_2$ in the underfloor catalyst of the invention is preferably contained in the lower layer of the catalyst layer in a form present in a CZ complex oxide having the composition specified below. The proportions of each of the following metal elements are as follows, in terms of their oxides, with the total mass of the CZ complex oxide as 100 mass %.

Ce: 1 mass % to 90 mass % as $CeO_2$
Zr: 90 mass % or less as $ZrO_2$
Rare earth element excluding Ce: 1 mass % to 20 mass % in terms of $Ln_2O_3$.

However, the total of the Zr content in terms of $ZrO_2$ and the Ce content in terms of $CeO_2$ is 80 mass % or greater, where 100 mass % is the total mass of the CZ complex oxide.

If the total mass of the CZ complex oxide is defined as 100 mass %, the Ce content in terms of $CeO_2$, is
more preferably 5 mass % or greater, even more preferably 15 mass % or greater and most preferably 25 mass % or greater; and
more preferably 80 mass % or less, even more preferably 70 mass % or less and most preferably 60 mass % or less.

If the total mass of the CZ complex oxide is defined as 100 mass %, the Zr content in terms of $ZrO_2$ is
more preferably 2 mass % or greater, even more preferably 10 mass % or greater and most preferably 20 mass % or greater; and
more preferably 85 mass % or less, even more preferably 75 mass % or less and most preferably 60 mass % or less.

If the total mass of the CZ complex oxide is defined as 100 mass %, the content of rare earth elements excluding Ce, in terms of $Ln_2O_3$, is
more preferably 3 mass % or greater, even more preferably 5 mass % or greater and most preferably 8 mass % or greater; and
more preferably 18 mass % or less, even more preferably 15 mass % or less and most preferably 12 mass % or less.

The BET specific surface area of the $CeO_2$ particles or CZ complex oxide particles in the lower layer of the catalyst layer is
preferably 10 $m^2/g$ or greater, more preferably 50 $m^2/g$ or greater and even more preferably 100 $m^2/g$ or greater; and
preferably 1,000 $m^2/g$ or less, more preferably 500 $m^2/g$ or less and even more preferably 250 $m^2/g$ or less.

The mean particle size of the $CeO_2$ particles or CZ complex oxide particles in the lower layer of the catalyst layer is
preferably 0.001 µm or larger, more preferably 0.02 µm or larger and even more preferably 0.1 µm or larger; and
preferably 200 µm or smaller, more preferably 100 µm or smaller and even more preferably 25 µm or smaller.

(Proportions of Alumina and $CeO_2$ Used in Lower Layer)

The proportion of alumina and $CeO_2$ used in the lower layer of the catalyst layer of the underfloor catalyst of the invention may be such that the mass ratio of alumina with respect to their total is, for example:
5 mass % or greater, preferably 10 mass % or greater, more preferably 20 mass % or greater, even more preferably 30 mass % or greater and most preferably 40 mass % or greater; and
95 mass % or less, preferably 90 mass % or less, more preferably 85 mass % or less, even more preferably 80 mass % or less and most preferably 75 mass % or less. By setting the proportion of alumina in the lower layer to within this range, distributed allocation of a significant amount of $CeO_2$ in the lower layer will be ensured. This is preferred as it can maintain the $NO_x$ purification performance of the Rh in the upper layer while ensuring the atmosphere relaxation necessary to maintain (or recover) the catalytic activity of Rh.

When $CeO_2$ is present in the lower layer in a form included in a complex oxide, the mass of the $CeO_2$ used for calculation of the proportion of alumina and $CeO_2$ is the mass of the complex oxide.

(Other Components)

The lower layer of the catalyst layer in the underfloor catalyst of the invention may contain components other than alumina and $CeO_2$, depending on the technical need. Examples of such other components include binders, transition metals, alkali metal compounds, alkaline earth metal compounds and rare earth compounds.

Binders have the function of binding between the components, or between the components and the substrate or other layers, to impart mechanical strength to the catalyst layer in the underfloor catalyst of the invention. Examples of such binders include alumina sol, zirconia sol, silica sol and titania sol.

The proportion of binder used in the lower layer of the catalyst layer of the underfloor catalyst of the invention is preferably 20 mass % or less and more preferably 10 mass % or less, with 100 mass % as the total mass of the lower layer. While the lower limit for this value is optional, an example may be 0.5 mass % or greater.

Examples of transition metals include nickel, copper, manganese, iron, cobalt and zinc. Among these, using nickel in combination has an effect of minimizing generation of hydrogen sulfide. Examples of alkali metal compounds include potassium compounds and lithium compounds; examples of alkaline earth metal compounds include calcium compounds, barium compounds and strontium compounds; and examples of rare earth compounds include lanthanum oxide, praseodymium oxide and neodymium oxide. These have effects of improving the heat resistance of the obtained catalyst.

The lower layer of the catalyst layer in the underfloor catalyst of the invention preferably contains a sulfate of an alkaline earth metal, from the viewpoint of minimizing stabilization of the state of Rh oxides in the upper layer. Sulfates of alkaline earth metals that are used may be selected from among barium sulfate and strontium sulfate. The content of alkaline earth metal sulfates in the lower layer with respect to the total mass of alumina and $CeO_2$, is
preferably 5 mass % or greater, more preferably 10 mass % or greater and even more preferably 15 mass % or greater; and
preferably 100 mass % or less, more preferably 50 mass % or less and even more preferably 30 mass % or less.

(Amount of Lower Layer)

When the lower layer is a coat layer on the substrate, the amount of the lower layer, in terms of the mass of the lower layer per 1 L of substrate capacity, is preferably 10 g/L or greater, more preferably 25 g/L or greater, even more preferably 50 g/L or greater and most preferably 75 g/L or greater; and preferably 1,000 g/L or less, more preferably 500 g/L or less, even more preferably 300 g/L or less and most preferably 200 g/L or less.

—Upper Layer—

The upper layer of the catalyst layer in the underfloor catalyst of the invention contains Rh, alumina and $CeO_2$, the content of noble metals other than Rh being 1 mol % or less with respect to the total of the noble metals in the upper layer. It contains alumina and $CeO_2$, and further contains Rh alone as a noble metal.

The upper layer contains essentially no noble metals other than Rh, which are typically Pd and Pt commonly used in exhaust gas purification catalysts. The phrase "contains essentially no" noble metals other than Rh means that the content of these noble metal elements is 1 mol % or less of the metals in the upper layer, and it may be preferably 0.5 mol % or less, more preferably 0.1 mol % or less and even more preferably 0.05 mol % or less. It is most preferably 0 mol %.

(Alumina and $CeO_2$)

The alumina and $CeO_2$ used in the upper layer are preferably the same substances as explained above for the alumina and $CeO_2$ in the lower layer.

(Proportions of Alumina and $CeO_2$ Used in Upper Layer)

The proportion of alumina and $CeO_2$ used in the upper layer of the catalyst layer of the underfloor catalyst of the invention may be such that the mass ratio of alumina with respect to their total is, for example:

5 mass % or greater, preferably 10 mass % or greater, more preferably 15 mass % or greater and most preferably 20 mass % or greater; and 90 mass % or less, preferably 80 mass % or less, more preferably 50 mass % or less and most preferably 40 mass % or less. By setting the proportion of alumina in the upper layer to within this range, a significant amount of $CeO_2$ will be present in the upper layer. This is preferred as it will maintain the high $NO_x$ removability of the Rh, while exhibiting an atmosphere relaxation effect.

When $CeO_2$ is present in the upper layer in a form included in a complex oxide, the mass of the $CeO_2$ used for calculation of the proportion of alumina and $CeO_2$ is the mass of the complex oxide.

(Rh)

The upper layer of the catalyst layer in the underfloor catalyst of the invention contains Rh, together with the alumina and $CeO_2$. The Rh is supported on either or both the alumina and $CeO_2$.

The Rh is preferably present in particulate form. In this case, the mean particle size of the Rh particles is preferably 0.001 nm or larger, more preferably 0.01 nm or larger and even more preferably 0.1 nm or larger; and preferably 250 nm or smaller, more preferably 100 nm or smaller and even more preferably 25 nm or smaller.

The Rh content (loading mass) in the upper layer of the underfloor catalyst of the invention, with respect to the total mass of the alumina and $CeO_2$, is preferably 0.001 mass % or greater, more preferably 0.005 mass % or greater, even more preferably 0.01 mass % or greater and most preferably 0.05 mass %; and preferably 5 mass % or less, more preferably 3 mass % or less, even more preferably 1 mass % or less and most preferably 0.5 mass % or less. The underfloor catalyst of the invention is advantageous in that a high degree of sweeper performance can be exhibited even when the amount of Rh in the upper layer is limited to 0.5 mass % or less, or even 0.3 mass % or less, and especially 0.1 mass % or less.

(Other Components)

The upper layer of the catalyst layer in the underfloor catalyst of the invention may contain components other than alumina, $CeO_2$ and Rh, depending on the technical need. The other components that may be used are the same components as mentioned above for other components in the lower layer.

(Amount of Upper Layer)

The amount of the upper layer, in terms of the mass of the upper layer per 1 L of substrate capacity, is preferably 10 g/L or greater, more preferably 25 g/L or greater, even more preferably 50 g/L or greater and most preferably 75 g/L or greater; and preferably 1,000 g/L or less, more preferably 500 g/L or less, even more preferably 300 g/L or less and most preferably 200 g/L or less.

[Construction of Lower Layer and Upper Layer]

(Total Amount of $CeO_2$)

The total amount of $CeO_2$ in the lower layer and upper layer of the underfloor catalyst of the invention is 14 g/L to 30 g/L. An amount within this range will allow both high $NO_x$ purification performance of the Rh and satisfactory atmosphere relaxation to be achieved. The value is preferably 16 g/L or greater, more preferably 18 g/L or greater and even more preferably 20 g/L or greater; and preferably 28 g/L or less, more preferably 27 g/L or less and even more preferably 26 g/L or less.

When $CeO_2$ is present in the catalyst layer in a form included as a complex oxide, the amount of $CeO_2$ is the value of the amount of Ce atoms in the complex oxide in terms of oxide.

($Ceo_2$ Distribution)

The $CeO_2$ in the exhaust gas purification catalyst of the invention is distributed in the upper layer and the lower layer. By distributing the $CeO_2$ in the upper and lower layers, it is possible to achieve atmosphere relaxation without impairing the reducing power of the Rh in the upper layer.

Of the total amount of $CeO_2$, 7 g/L to 25 g/L is present in the upper layer. $CeO_2$ present in proximity to a noble metal generally exhibits oxygen storage capacity even in the low-temperature region. Consequently, the $CeO_2$ in the upper layer together with the Rh will exhibit adequate warm-up performance if present at 7 g/L or greater. On the other hand, impairment of the reducing performance of the Rh will be avoided if the $CeO_2$ in the upper layer is 25 g/L or less. The $CeO_2$ content in the upper layer is preferably 8 g/L or greater, more preferably 10 g/L or greater and even more preferably 12.5 g/L or greater; and preferably 22.5 g/L or less, more preferably 20 g/L or less and even more preferably 17.5 g/L or less.

Of this total amount of $CeO_2$, the amount of $CeO_2$ in the lower layer is at least 20% of that in the upper layer. If the amount of $CeO_2$ in the lower layer is at least 20% of the amount of $CeO_2$ in the upper layer, the reducing power of the Rh can be improved. The amount of $CeO_2$ in the lower layer with respect to the amount of $CeO_2$ in the upper layer, is preferably at least 25%, more preferably at least 30% and most preferably at least 40%; and preferably 80% or less, more preferably 70% or less and most preferably 60% or less.

(Length of Catalyst Layer)

When the lower layer of the catalyst layer is a coat layer on a substrate, the lower layer may be formed over the entire substrate length (the substrate length in the direction of gas flow), or it may be formed on only part of the substrate length. The upper layer may also be formed over the entire substrate length, or it may be formed on only part of the substrate length.

The phrase "entire substrate length" means the length of the portion of the substrate presumed as the region on which the catalyst layer is to be formed, and that length does not include portions that normally are not related to formation of the catalyst layer, such as the lid portion that serves to shield the catalyst layer from external air, or the joint portions that serve to connect the catalyst system to the exhaust channel.

The coat lengths of the upper layer and lower layer will now be explained, distinguishing between the case where the catalyst layer having the upper layer and lower layer is a coat layer on a separate substrate, and the case where the lower layer forms part of the substrate and the upper layer is present as a coat layer on the substrate.

—Case where Catalyst Layer is a Coat Layer on a Substrate—

In this case, in order to effectively exhibit the respective functions of the upper layer and lower layer, the coat length of the lower layer is preferably 50% or more of the substrate length, and the coat length of the upper layer is preferably 70% or more of the substrate length.

According to a preferred aspect of the invention, the coat length of the lower layer of the catalyst layer is a value of less than 100% of the substrate length from the back end with respect to the direction of gas flow, leaving a front region where the lower layer is not formed, and the upper layer is coated from the front end, thereby providing a region where only the upper layer is formed without a lower layer, at the front end of the substrate. The reason for situating the region with only the upper layer and without the lower layer, on the substrate at the front end of the catalyst, is as follows.

In the region without the lower layer, the amount of $CeO_2$ with respect to Rh in the upper layer is relatively low. Thus, during reacceleration after fuel cutoff, for example, Rh can be restored to the active reduced state with a small amount of reducing agent. Therefore, placement of such a region at the front end of the catalyst is preferred from the viewpoint of further increasing the sweeper performance of the underfloor catalyst of the invention.

From this viewpoint, the coat length of the lower layer is preferably 50% or more, more preferably 60% or more and even more preferably 70% or more of the substrate length from the back end with respect to the direction of gas flow. The upper limit for the value is optional but is preferably 85% or less.

As mentioned above, the coat length of the upper layer is preferably 70% or more, more preferably 80% or more, even more preferably 90% or more and most preferably 90% or more, and may even be 100%, of the substrate length from the front end in the direction of gas flow.

The length of the region where the upper layer is directly coated on the substrate without a lower layer on the substrate is preferably 15% or more and more preferably 30% or more; and preferably 50% or less and even more preferably 40% or less of the length of the substrate.

—Case where the Lower Layer Forms Part of the Substrate and the Upper Layer is Present as a Coat Layer on the Substrate—

In this case, the coat length of the upper layer may be 70% or more of the substrate length from the front end in the direction of gas flow.

[Method of Producing Underfloor Catalyst]

The underfloor catalyst of the invention may be produced by any method so long as it has a catalyst layer as described above. The method of producing the underfloor catalyst of the invention may be any of the following exemplary methods.

(First Production Method)

A method comprising preparing a substrate, and forming a lower layer containing alumina and $CeO_2$ and an upper layer containing Rh, alumina and $CeO_2$ in that order on the substrate to produce a catalyst layer.

(Second Production Method)

A method comprising firing of a starting mixture including alumina and $CeO_2$ to form a substrate as a lower layer, and forming an upper layer containing Rh, alumina and $CeO_2$ on the substrate to produce a catalyst layer having a substrate as the lower layer, and an upper layer.

With the first production method of the invention, an underfloor catalyst is obtained having a catalyst layer on a substrate. With the second production method, an underfloor catalyst is obtained having a lower layer forming part of the substrate, and an upper layer on the substrate.

In either method, the noble metal content in the lower layer, the content of noble metals other than Rh in the upper layer, and the amount of $CeO_2$ in the lower layer and upper layer, may be adjusted so that the obtained underfloor catalyst is within the prescribed range of the invention.

The first and second production methods will now be explained in order.

1. First Production Method

The substrate used in the first production method may be selected as any desired substrate that is to have an underfloor catalyst. For example, it may be a monolith honeycomb substrate composed of cordierite or metal oxide particles, as described above.

The lower layer and upper layer may each be formed by a method of preparing a slurry for the lower layer or for the upper layer, coating the slurry onto a substrate or onto a lower layer formed on the substrate, and then firing it, if necessary after drying.

(Formation of Lower Layer)

The lower layer slurry used to form the lower layer on the substrate contains alumina and $CeO_2$, as well as other components that are used as necessary (especially an alkaline earth metal sulfate), in a prescribed proportion. The $CeO_2$ may be present in the slurry as a CZ complex oxide, depending on the form in which it is to be present in the lower layer. The solvent for the lower layer slurry may be water, for example.

The method used for coating of the slurry may be a publicly known method such as dipping or pouring, without any restrictions. A drying step may be carried out if necessary after coating of the slurry. This step may be a method of heating at a temperature of 60 to 300° C., for example, and preferably 120 to 250° C., for 5 to 120 minutes, for example, and preferably 10 to 60 minutes.

The heating temperature for firing may be above 300° C. and 1,000° C. or lower, for example, and is preferably 400° C. to 1,000° C. The heating time may be 0.1 to 10 hours, for example, and is preferably 0.5 to 5 hours.

(Formation of Upper Layer)

The upper layer slurry used to form the upper layer on the substrate, or on the lower layer formed on the substrate, contains alumina and $CeO_2$, and also a Rh precursor, while also containing other components that are used as necessary. The form of the $CeO_2$ in the upper layer slurry is the same as in the lower layer slurry. The solvent for the upper layer slurry may be water, for example.

The Rh precursor used is preferably a water-soluble Rh salt. Examples of specific compounds include rhodium nitrate, rhodium chloride, sodium rhodium chloride, rhodium pentamine chloride and carbonyl acetyl rhodium, with rhodium nitrate being preferred from the viewpoint of water solubility.

The upper layer of the invention may be formed in the same manner as formation of the lower layer, except for using the upper layer slurry.

2. Second Production Method

In the second production method, the substrate as the lower layer may be formed by the method described in PTL 5, for example, with the starting material being oxide particles including alumina and $CeO_2$ as all or some of the metal oxide particles composing the substrate.

In this case, the substrate can be obtained, specifically, by adding water and a binder to oxide particles including alumina and $CeO_2$ as prescribed by the invention, and firing the obtained starting mixture, for example. The starting mixture may be kneaded and then extrusion molded into the desired form, and optionally dried before firing.

An upper layer containing Rh, alumina and $CeO_2$ is then formed on the obtained substrate. Formation of the upper layer on the substrate may be carried out in the same manner as for formation of the upper layer in the first production method.

This procedure produces an underfloor catalyst of the invention having a substrate as the lower layer, and an upper layer.

[Advantages of Underfloor Catalyst of the Invention]

The underfloor catalyst of the invention as described above has an upper layer comprising Rh alone as the noble metal and a lower layer without Rh, on a substrate, with the $CeO_2$ divided between the upper layer and lower layer, as an OSC material having oxygen storage and emission capacity. Such a construction increases the Rh reduction reactivity, and exhibits extremely high sweeper performance even with a small amount of Rh.

Therefore, the underfloor catalyst of the invention can be suitably applied as an exhaust gas purification catalyst system in combination with a front stage catalyst containing Pd as an active noble metal.

<Exhaust Gas Purification Catalyst System>

The exhaust gas purification catalyst system of the invention is preferably constructed of
 a front stage catalyst having a substrate and a Pd-containing coat layer on the substrate, and
 an underfloor catalyst of the invention as described above.

[Front Stage Catalyst]

As mentioned above, the front stage catalyst in the exhaust gas purification catalyst system of the invention preferably has a substrate and a Pd-containing coat layer on the substrate. The coat layer may also contain carrier particles and other components as necessary, in addition to Pd.

Metal oxide particles may be suitably used as the carrier particles. Specifically, they may be particles of alumina, titania, rare earth element oxides or CZ (ceria-zirconia complex oxide), for example, or mixtures thereof.

Examples of such other components for the front stage catalyst include binders, transition metals, alkali metal compounds, alkaline earth metal compounds and rare earth compounds. Of these, alkaline earth metal sulfates are preferably added.

Such a front stage catalyst can be produced by a publicly known method using desired components or their precursors.

[Advantages of Exhaust Gas Purification Catalyst System of the Invention]

The exhaust gas purification catalyst system of the invention is provided with a front stage catalyst containing Pd as the active noble metal, and an underfloor catalyst of the invention exhibiting very high sweeper performance with a small amount of Rh. Since a very small amount of noble metal (Rh) may be situated in the underfloor catalyst of the invention, a correspondingly greater amount of noble metals can be situated in the front stage catalyst.

The exhaust gas purification catalyst system of the invention having the construction described above can exhibit a high level of both warm-up performance and sweeper performance.

EXAMPLES

The substrates used for the following catalyst preparation examples were monolith honeycomb substrates with capacity of 1 L.

<Preparation of Start-Up Catalysts>

Preparation Example F1

(1) Preparation of Catalyst F1P (Lower Layer Coat Product)

After mixing 50 g of a CZ complex oxide having the composition $CeO_2/ZrO_2/La_2O_3/Nd_2O_3=20/70/5/5$ (mass ratio) (10 g as $CeO_2$), $Al_2O_3$: 50 g, barium sulfate (20 g as oxide) and palladium nitrate (3 g as Pd metal) in ion-exchanged water: 300 g, the mixture was subjected to wet grinding using a ball mill to obtain a lower layer slurry. The slurry was coated onto a monolith honeycomb substrate over a region of 100% of the full length of the substrate (100 mm), to a solid equivalent amount of 123 g, and after drying at 250° C. for 1 hour, it was fired at 500° C. for 1 hour to prepare catalyst F1P (lower layer coat product).

(2) Preparation of Catalyst F1 (Upper Layer Coat Product)

Next, CZ complex oxide with the same composition as above: 75 g (15 g as $CeO_2$), $Al_2O_3$: 25 g and rhodium nitrate (0.1 g as Rh metal) were mixed in ion-exchanged water: 300 g, and the mixture was subjected to wet grinding using a ball mill to obtain an upper layer slurry. The slurry was coated onto the catalyst F1P over a region of 100% of the full length of the catalyst (100 mm), to a solid equivalent amount of 100.1 g, and after drying at 250° C. for 1 hour, it was fired at 500° C. for 1 hour to prepare catalyst F1 (upper layer coat product).

Preparation Example F2

Catalyst F2 was prepared by the same procedure as Preparation Example F1, except that in "(1) Preparation of catalyst F1P (lower layer coat product)" of Preparation Example F1, the amount of palladium nitrate used was 2 g as Pd metal and the coating amount was 122 g.

Preparation Examples R3 to R13

Catalysts R3 to R13 were prepared in the same manner as Preparation Example F1, except that the compositions of the lower layer slurries and upper layer slurries, the coating amounts and the coat lengths of both layers were as listed in Table 1. Preparation Examples R4, R7 and R9 are Comparative Preparation Examples.

TABLE 1

Preparation of catalysts

| | Lower layer | | | | | | Upper layer | | | | | | |
|---|---|---|---|---|---|---|---|---|---|---|---|---|---|
| | Amount of component used (g) | | | | Manner of coating | | Amount of component used (g) | | | | Manner of coating | | |
| | | | | | Coating | | | | | | Coating | | |
| | CZ | $Al_2O_3$ | $BaSO_2$ (as oxide) | $Pd(NO_3)_2$ (as Pd) | amount (g) | Coat length | CZ | $Al_2O_3$ | $BaSO_2$ (as oxide) | $Rh(NO_3)_3$ (as Rh) | amount (g) | Coat length | Catalyst name |
| Prep. Ex. R1 | 50 | 50 | 20 | 1*) | 121 | 100% | 75 | 25 | — | 0.1 | 100.1 | 100% | R1 |
| Prep. Ex. R2 | Monolayer structure | | | | | | 125 | 75 | 20 | 0.1 | 220.1 | 100% | R2 |
| Prep. Ex. R3 | 50 | 50 | 20 | — | 120 | 100% | 75 | 25 | — | 0.1 | 100.1 | 100% | R3 |
| Prep. Ex. R4 | 17.5 | 82.5 | 20 | — | 120 | 100% | 17.5 | 82.5 | — | 0.1 | 100.1 | 100% | R4 |
| Prep. Ex. R5 | 35 | 65 | 20 | — | 120 | 100% | 35 | 65 | — | 0.1 | 100.1 | 100% | R5 |
| Prep. Ex. R6 | 75 | 25 | 20 | — | 120 | 100% | 75 | 25 | — | 0.1 | 100.1 | 100% | R6 |
| Prep. Ex. R7 | 100 | 10 | 20 | — | 130 | 100% | 100 | 10 | — | 0.1 | 110.1 | 100% | R7 |
| Prep. Ex. R8 | 25 | 75 | 20 | — | 120 | 100% | 125 | 10 | — | 0.1 | 135.1 | 100% | R8 |
| Prep. Ex. R9 | 10 | 90 | 20 | — | 120 | 100% | 100 | 10 | — | 0.1 | 110.1 | 100% | R9 |
| Prep. Ex. R10 | 50 | 50 | 20 | — | 120 | 85% from back end | 75 | 25 | — | 0.1 | 100.1 | 100% | R10 |
| Prep. Ex. R11 | 50 | 50 | 20 | — | 120 | 40% from back end | 75 | 25 | — | 0.1 | 100.1 | 100% | R11 |
| Prep. Ex. R12 | 50 | 50 | 20 | — | 120 | 85% from back end | 75 | 25 | — | 0.1 | 100.1 | 60% from front end | R12 |
| Prep. Ex. R13 | 50 | 50 | 20 | — | 120 | 85% from back end | 75 | 25 | — | 0.1 | 100.1 | 70% from front end | R13 |

*)The amount of Pd in the catalyst R1 lower layer corresponds to 0.86 mass % of the lower layer after coating.

<Preparation of Rear Stage Catalyst (Underfloor Catalyst)>

Preparation Example R1 (Comparative Preparation Example)

Catalyst R1 was prepared by the same procedure as Preparation Example F1, except that in "(1) Preparation of catalyst F1P (lower layer coat product)" of Preparation Example F1, the amount of palladium nitrate used was 1 g as Pd metal (corresponding to 0.83 mass % with respect to the mass of the lower layer after coating) and the coating amount was 121 g.

Preparation Example R2 (Comparative Preparation Example)

A CZ complex oxide having the composition $CeO_2/ZrO_2/La_2O_3/Nd_2O_3=20/70/5/5$ (mass ratio): 125 g (25 g as $CeO_2$), $Al_2O_3$: 75 g, barium sulfate (20 g as oxide) and rhodium nitrate (0.1 g as Rh metal) were mixed in ion-exchanged water: 300 g, and the mixture was subjected to wet grinding using a ball mill to obtain a slurry. The slurry was coated onto a monolith honeycomb substrate over a region of 100% of the full length of the substrate (100 mm), to a solid equivalent amount of 220.1 g, and after drying at 250° C. for 1 hour, it was fired at 500° C. for 1 hour to prepare catalyst R2 (monolayer coat product).

<Catalyst Evaluation>

(1) First, the effects of typical examples of exhaust gas purification catalysts of the invention were experimentally demonstrated.

Example 1

Catalyst F1 was mounted as the front stage catalyst and catalyst R3 as the rear stage catalyst of the monolith honeycomb catalyst system illustrated in FIG. 1. The internal temperature of the catalyst bed (1-inch) was set to 1,000° C., and endurance corresponding to 150,000 km running was carried out while varying the air-fuel ratio at a constant cycle within a range of 11 to ∞ (infinity) by fuel increase and fuel cutoff.

After endurance, the catalyst system was mounted in an actual turbo-charger-mounted vehicle with 1.6 L cylinder capacity, and the HC and $NO_x$ emissions (mg/km) were measured during running in NEDC mode on a chassis dynamometer. The results are shown in Table 2.

Comparative Examples 1 and 2

The catalysts were evaluated in the same manner as Example 1, except that the front stage catalyst and rear stage catalyst were each as listed in Table 2. The evaluation results are shown in Table 2.

TABLE 2

| | Front stage catalyst Name | Rear stage catalyst Name | Amount of CeO$_2$ (g) Lower layer | Amount of CeO$_2$ (g) Upper layer | Amount of CeO$_2$ (g) Total for both layers | Lower layer CeO$_2$/ upper layer CeO$_2$ (%) | Coat length (%) Lower layer | Coat length (%) Upper layer | Evaluation results Emissions during mode running (mg/km) HC | Evaluation results Emissions during mode running (mg/km) NO$_x$ |
|---|---|---|---|---|---|---|---|---|---|---|
| Example 1 | F1 | R3 | 10.0 | 15.0 | 25.0 | 66.7 | 100 | 100 | 74 | 38 |
| Comp. Example 1 | F2 | R1*) | 10.0 | 15.0 | 25.0 | 66.7 | 100 | 100 | 90 | 40 |
| Comp. Example 2 | F1 | R2 | — | 25.0 | 25.0 | 0 | — | 100 | 75 | 50 |

*) Catalyst R1 contains Pd in the lower layer.

By comparing Example 1 with Comparative Example 1 which contained a significant amount of a noble metal (Pd) in the lower layer and Comparative Example 2 which had a monolayer structure, in Table 2, it was confirmed that using the underfloor catalyst of the invention as a rear stage catalyst in a catalyst system increases NO$_x$ removal performance. This was attributed to increased Rh reduction reactivity, since CeO$_2$, as an OSC material with oxygen storage and emission capacity, was divided between the upper layer containing Rh and the lower layer containing essentially no noble metal.

By comparing Example 1 and Comparative Example 1, it is also seen that with the underfloor catalyst of the invention, the HC removal performance was increased while maintaining a high level of NO$_x$ removal performance. It is conjectured that, since the NO$_x$ removal performance as an underfloor catalyst could be exhibited even in the absence of Pd due to the amount and distribution of CeO$_2$ in the catalyst of the invention, the Pd which was no longer necessary in the underfloor catalyst could be situated in the front stage catalyst, allowing the HC removal performance to be improved.

(2) The effect of the amount of CeO$_2$ in the lower layer and in the upper layer was examined next.

Examples 2 to 4 and Comparative Examples 3 to 5

The catalysts were evaluated in the same manner as Example 1, except that the front stage catalyst and rear stage catalyst were each as listed in Table 3. The evaluation results are shown in Table 3 together with the results of Example 1.

TABLE 3

| | Front stage catalyst Name | Rear stage catalyst Name | Amount of CeO$_2$ (g) Lower layer | Amount of CeO$_2$ (g) Upper layer | Amount of CeO$_2$ (g) Total for both layers | Lower layer CeO$_2$/ upper layer CeO$_2$ (%) | Evaluation results Emissions during mode running (mg/km) HC | Evaluation results Emissions during mode running (mg/km) NO$_x$ |
|---|---|---|---|---|---|---|---|---|
| Example 1 | F1 | R3 | 10.0 | 15.0 | 25.0 | 66.7 | 74 | 38 |
| Comp. Ex. 3 | F1 | R4 | 3.5 | 3.5 | 7.0 | 100 | 74 | 51 |
| Example 2 | F1 | R5 | 7.0 | 7.0 | 14.0 | 100 | 73 | 42 |
| Comp. Ex. 4 | F1 | R9 | 2.0 | 20.0 | 22.0 | 10.0 | 72 | 49 |
| Example 3 | F1 | R8 | 5.0 | 25.0 | 30.0 | 20.0 | 73 | 42 |
| Example 4 | F1 | R6 | 15.0 | 15.0 | 30.0 | 100 | 74 | 41 |
| Comp. Ex. 5 | F1 | R7 | 20.0 | 20.0 | 40.0 | 100 | 75 | 50 |

Upon comparing Examples 1 to 4 and Comparative Examples 3 and 5 in Table 3, it was found that satisfactory results were obtained when the total amount of CeO$_2$ in both layers was in the range of 14 g/L to 30 g/L. The NO$_x$ removal performance is reduced when the total amount of CeO$_2$ deviates from this range. It was conjectured that this occurs because an insufficient total amount of CeO$_2$ results in inadequate atmosphere relaxation, while an excess total amount of CeO$_2$ inhibits reduction reaction of Rh.

Judging from Comparative Example 4, however, the NO$_x$ removal performance was inferior when the amount of CeO$_2$ in the lower layer was insufficient, even with a total amount of CeO$_2$ within the aforementioned range. This was thought to occur because the effect of promoting reduction of Rh by dividing the OSC material between both layers was inadequately exhibited, due to an insufficient amount of $CeO_2$ in the lower layer. The amount of $CeO_2$ in the lower layer is preferably 20% or more of the amount of $CeO_2$ in the upper layer.

(3) Next, the effect of setting a monolayer region of the upper layer on the substrate was confirmed.

Examples 5 to 8

The catalysts were evaluated in the same manner as Example 1, except that the front stage catalyst and rear stage catalyst were each as listed in Table 4. The evaluation results are shown in Table 4 together with the results of Example 1.

TABLE 4

| | | Catalyst system | | | | | | | | |
|---|---|---|---|---|---|---|---|---|---|---|
| | | Rear stage catalyst | | | | | | | | |
| | | Amount of $CeO_2$ (g) | | | | Coat length (%) | | | Evaluation results | |
| Front stage catalyst | | Lower layer | | Total for both | $CeO_2$/ upper layer | Lower | Upper | Upper layer | Emissions during mode running (mg/km) | |
| Name | Name | Lower layer | Uppe layer | layers | $CeO_2$ (%) | layer | layer | monolayer | HC | $NO_x$ |
| Example 1 | F1 | R3 | 10.0 | 15.0 | 25.0 | 66.7 | 100 | 100 | 0 | 74 | 38 |
| Example 5 | F1 | R12 | 10.0 | 15.0 | 25.0 | 66.7 | 85 | 60 | 15 | 74 | 41 |
| Example 6 | F1 | R13 | 10.0 | 15.0 | 25.0 | 66.7 | 85 | 70 | 15 | 74 | 39 |
| Example 7 | F1 | R10 | 10.0 | 15.0 | 25.0 | 66.7 | 85 | 100 | 15 | 72 | 32 |
| Example 8 | F1 | R11 | 10.0 | 15.0 | 25.0 | 66.7 | 40 | 100 | 60 | 74 | 41 |

Based on comparison between Example 1 and Example 7, it was seen that the $NO_x$ removal performance was further improved by setting a monolayer region of the upper layer over a length of 20% of the full length, with the coat length of the lower layer at 80%. This is conjectured to be because partial reduction in the amount of $CeO_2$ produced a section where the Rh reduction reaction was preferentially promoted, while the total amount of $CeO_2$ was approximately equal in both layers, and therefore adequate atmosphere relaxation was achieved in the two-layer portion. However, when the length of the monolayer region of the upper layer was long (Example 8) and when the length of the upper layer itself was short (Examples 5 and 6), the effect of setting the monolayer region of the upper layer was not exhibited, and no further improvement in $NO_x$ removal performance was seen. This is thought to be because purification of the section with large gas volume was insufficient. In light of these results, the length of the monolayer region of the upper layer is preferably 50% or less of the substrate length, and the length of the upper layer is preferably 70% or greater of the substrate length.

The invention claimed is:

1. An exhaust gas purification underfloor catalyst comprising a catalyst layer having a lower layer and an upper layer,
   the lower layer containing alumina and CeO2, a noble metal content of the lower layer being 0.01 mass % or less with respect to the mass of the lower layer,
   the upper layer containing Rh, alumina and CeO2, a content of noble metals other than Rh being 1 mol % or less with respect to the total noble metals in the upper layer, the total amount of CeO2 in the lower layer and upper layer being 14 g/L to 30 g/L,
   the amount of CeO2 in the upper layer being 7 g/L to 25 g/L, and the amount of CeO2 in the lower layer being 20% 40% or more and 80% or less of the amount of CeO2 in the upper layer.

2. The exhaust gas purification underfloor catalyst according to claim 1, wherein the catalyst layer is a coat layer on a substrate.

3. The exhaust gas purification underfloor catalyst according to claim 2, wherein:
   the coat length of the lower layer is 50% or more of the substrate length from the back end with respect to the direction of gas flow, and
   the coat length of the upper layer is 70% or more of the substrate length from the front end in the direction of gas flow.

4. The exhaust gas purification underfloor catalyst according to claim 2, wherein:
   the coat length of the lower layer is 50% to 85% of the substrate length from the back end with respect to the direction of gas flow, and
   the catalyst has a region where the upper layer is directly coated on the substrate in a range of 15% to 50% of the substrate length.

5. The exhaust gas purification underfloor catalyst according to claim 1, wherein the lower layer forms part of a substrate, and the upper layer is a coat layer on the substrate.

6. The exhaust gas purification underfloor catalyst according to claim 5, wherein the coat length of the upper layer is 70% or more of the substrate length from the front end in the direction of gas flow.

7. An exhaust gas purification catalyst system constructed of:
   a front stage catalyst having a substrate and a Pd-containing coat layer on a substrate, and
   an exhaust gas purification underfloor catalyst according to claim 1.

8. The exhaust gas purification underfloor catalyst according to claim 1, wherein:
   the $CeO_2$ is contained in the lower layer as a ceria-zirconia complex oxide, and
   the Zr content thereof in terms of $ZrO_2$ is 2 mass % or greater and 60 mass % or less, when the total mass of the ceria-zirconia complex oxide is defined as 100 mass %.

9. The exhaust gas purification underfloor catalyst according to claim 1, wherein:

the $CeO_2$ is contained in the upper layer as a ceria-zirconia complex oxide, and the Zr content thereof in terms of $ZrO_2$ is 2 mass % or greater and 75 mass % or less, when the total mass of the ceria-zirconia complex oxide is defined as 100 mass %.

10. The exhaust gas purification underfloor catalyst according to claim 1, wherein the total amount of $CeO_2$ in the lower layer and upper layer is 16 g/L to 28 g/L.

11. The exhaust gas purification underfloor catalyst according to claim 8, wherein the ceria-zirconia complex oxide in the lower layer is a complex oxide of metal elements consisting of cerium, zirconium, and a rare earth element excluding cerium.

12. The exhaust gas purification underfloor catalyst according to claim 9, wherein the ceria-zirconia complex oxide in the upper layer is a complex oxide of metal elements consisting of cerium, zirconium, and a rare earth element excluding cerium.

13. The exhaust gas purification underfloor catalyst according to claim 1, wherein the amount of $CeO_2$ in the upper layer is 7 g/L to 17.5 g/L.

* * * * *